United States Patent [19]

Johnson

[11] 4,419,942
[45] Dec. 13, 1983

[54] STOVE

[76] Inventor: Charles A. Johnson, E. 160 Luczs Creek Rd., Belfair, Wash. 98528

[21] Appl. No.: 401,946

[22] Filed: Jul. 26, 1982

[51] Int. Cl.³ .............................................. F23B 7/00
[52] U.S. Cl. .................................... 110/234; 110/203; 110/210; 110/341; 122/15; 126/34
[58] Field of Search ............... 110/203, 204, 210, 211, 110/212, 234, 341; 122/20 B, 15; 126/34, 132

[56] References Cited

U.S. PATENT DOCUMENTS

| | | | |
|---|---|---|---|
| 4,091,747 | 5/1978 | Chase | 110/210 |
| 4,309,947 | 1/1982 | Ketterer | 110/203 |
| 4,317,417 | 3/1982 | Foresto | 110/210 X |
| 4,319,556 | 3/1982 | Schwartz et al. | 110/203 X |
| 4,330,503 | 5/1982 | Allaire et al. | 110/203 X |

*Primary Examiner*—Edward G. Favfors
*Attorney, Agent, or Firm*—David L. Garrison

[57] ABSTRACT

A stove in which the fuel is combusted within a primary combustion zone and the products of combustion are transported into a tertiary combustion zone surrounded by a container of water. A bundle of secondary combustion tubes connect the primary and tertiary combustion zones. The tertiary combustion and separation chamber termed a posatron completes the combustion and separates a portion of the creosote and other condensable materials from the combustion gases. The combustion gases are then conducted through small pipes immersed in the water bath to cool the combustion gases and complete the condensation of water, creosote and other unburned constituents. The water and creosote mixture flows into a creosote collection chamber and the products of combustion are either recycled to the combustion chamber or exhaused to the atmosphere. Heat is removed from the system by recirculating air or by hot water circulation.

14 Claims, 5 Drawing Figures

STOVE

TECHNICAL FIELD

This invention relates to improvements in combustion systems using wood, coal, fuel oil or the like as fuels in which the heat of the combustion is transferred to a working fluid.

BACKGROUND ART

Many devices are known in the art for the combustion of wood, coal and fuel oil for providing heat in homes, industrial applications and the like. Specifically with the combustion of wood stoves having a combustion chamber and some means for disposing of the combustion gases into the atmosphere are well known. Such devices suffer from inefficiency of removal of heat from the combustion gases and frequently have undesirable and obnoxious deposits of creosote and other materials appearing in the conduits leading to the combustion gas discharge location. Typical examples of devices used to enhance the removal of heat from combustion gases are found in U.S. Pat. No. 4,292,933 issued Oct. 6, 1981 to Meier, et al; U.S. Pat. No. 4,103,735 issued Aug. 1, 1978 to Warner; U.S. Pat. No. 419,125 issued Jan. 7, 1890 to Howe; and others. Typical examples of afterburner devices for furnaces and the like are found in U.S. Pat. No. 945,994 issued Jan. 11, 1910 to Vondenbosch; U.S. Pat. No. 4,145,979 issued Mar. 27, 1979 to Lilley et al; U.S. Pat. No. 3,754,869 issued Aug. 28, 1973 to Van Raden; and a recent patent showing a configuration for use as a hot water boiler is shown in U.S. Pat. No. 4,231,350 issued Nov. 4, 1980 to Marsh. While each of the foregoing references show attempts to maximize heat extraction and in some cases minimize the undesirable condensation of creosote or other undesirable products of combustion, none of the foregoing are fully satisfactory individually or in combination for the combined purpose of removing substantially all of the heat from combustion gases while removing creosote and avoiding pluggage problems which plague the prior art.

DISCLOSURE OF INVENTION

This invention has as an object the provision of a combustion device for the consumption of wood, coal or other solid fuels in which the extraction of useful heat is maximized.

This invention has as a further object the provision of a device in which wood or coal is burned with a minimum of deposition of solid or liquid creosote or acid deposits in areas in which plugging occurs.

This invention has as a further object the provision of a device in which heat is extracted while deposits are formed as liquids which are easily removed and drained from the apparatus.

The foregoing objects are attained in this invention by the provision of a combustion apparatus having a combustion chamber in which wood, coal or fuel oil is to be consumed. The combustion chamber is provided with a forced air inlet to provide sufficient oxygen for the combustion of the wood or coal, and optionally includes a means to inject water as an aid to combustion and subsequent downstream operation of the mechanism. The apparatus includes a bundle of combustion gas removing tubes extending into the heated zone of the fire box and through which the partially combusted gases exit the combustion chamber while undergoing secondary combustion. The bundle of tubes, which constitute a secondary combustion area, exit the combustion chamber and enter a water filled vessel which contains a tertiary combustion and separation chamber known herein as a posatron. The posatron comprises a closed chamber immersed in the water contained in the water filled tank and has in its interior a plurality of manifolded tubing sections into which the gases ultimately travel. A major portion of the creosote carried by the combustion gases condenses upon the interior walls of the posatron and due to the presence of simultaneously condensing water from the combustion gases the creosote is sufficiently liquid to flow down the walls of the posatron and into a collection chamber position beneath the water flow tank. The combustion gases flow upwardly through a plurality of tubing segments manifolded together into heat exchange tubes which extend upwardly through the top of the posatron into the water filled chamber and project downwardly therefrom through the bottom end of the water filled chamber into a creosote collection chamber positioned beneath the water filled chamber. Combustion gases and additional portions of condensed creosote and water flow downwardly into the creosote collection chamber where the gases separate from the liquids. A portion of the combustion gases are recyled into the combustion chamber while the remainder are permitted to exit the apparatus into the environment through a chimney or the like.

The water contained in the water vessel is heated by extraction of heat from the combustion gases both at the surface of the posatron and through the heat exchange tubes. In addition, a heating loop may be provided which extends into the combustions chamber and extracts heat directly from the combustion gases in a thermosiphon loop. Heat may be removed from the system either in the form of forced air or in the form of hot water circulated to radiators or the like.

The condensed creosote or other condensed substances may be removed from the collection vessel and either disposed of or sent to a central collection container for subsequent separation and use.

PREFERRED EMBODIMENT AND BEST MODE

Figure 1:
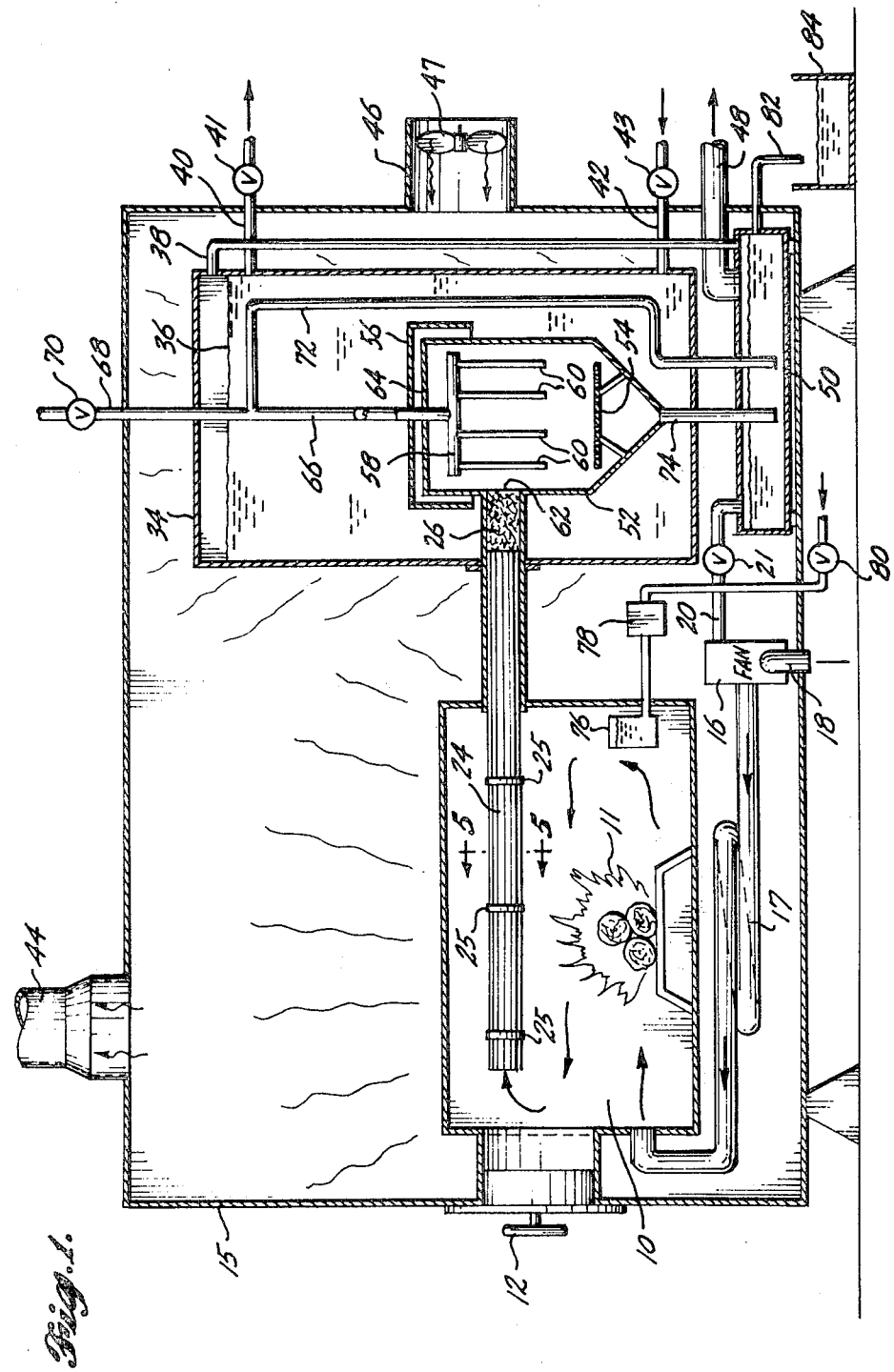
FIG. 1 is a side elevational view partly in section showing the device of this invention.

Referring specifically to the drawings, wherein like numerals indicate like parts, there is seen the inventor's preferred embodiment and best contemplated mode as of the time of the filing of this application for a patent. In FIG. 1 which constitutes a sectionalized side elevational view there is seen a wood, coal or oil burning stove mechanism which is used to provide heated air, heated water, or both for use in space heating of buildings such as a residence or an industrial facility. A combustion chamber 10 with a combustion zone or fire 11 is shown depicted with an entrance door or opening 12 through which additional fuel may from time to time be added to the system. A controlled volume of air through inlet 14 is provided to inject the necessary fresh air and recycle gases to properly control the combustion of the fuel within chamber 10. Fan 16 is provided with fresh air inlet 18 and recycle gas inlet 20 and controls the volume of air entering the combustion chamber 10. An elongated conduit 17 is used to conduct the mixture of air and recycle gases from fan 16 to the firebox and is of sufficient length to prevent flashback of fire or explosion during operation of the stove. The primary combustion of the wood or coal takes place in chamber 10 and the resulting combustion gases which may include partially burned hydrocarbons, carbon monoxide, vaporized creosote and various other normal products of wood or coal combustion circulate about the interior of the firebox and give up at least a portion of the heat generated to the walls of the firebox so that the air surrounding the firebox receives heat transferred thereto by well known conduction, convection and radiation transfer. A surrounding insulated enclosure 15 controls the flow of air being warmed about the firebox 10 so that heated air may be removed from the box if desired through hot air supply duct 44. Return air or ambient air to replace the heated air is permitted to enter the enclosure 15 through cool air return 46 and may be forced therein by fan 47.

The combustion gases together with an excess of oxygen to promote further combustion of the gases leaves the combustion chamber 10 through the tube bundle 24.

The combustion gases flow through the tube bundle 24 both within the interior of the individual tubes and in the intersticies between the tubes. The gases undergo a secondary combustion while in transit from the combustion chamber 10 to the adjacently positioned water filled vessel 34. The tube bundle 24, being positioned within the combustion chamber 10 as shown, receives heat and is maintained at an elevated temperature so that secondary combustion proceeds on gases as they are flowing through the tubes. The combustion gases leave the combustion chamber and may be subjected to the action of a catalyst 26, such as stainless steel wool or similar material to promote further combustion. The gases enter posatron 52, which constitutes a closed vessel immersed in water within vessel 34. The combustion gases are circulated within the posatron 52 and tertiary combustion takes place therein since the gases remain at a relatively elevated temperature. However, the walls of posatron 52, being in contact with water on their outer surface, tend to cool the gas to a certain extent and cause condensation of both water and creosote in situations in which wood is being used as the fuel. The water condenses from the combustion gases and any creosote which also condenses is maintained in a liquid solution or suspension. Additional water may be added to the combustion gases through the water injector 76 positioned within the combustion chamber 10 if desired in order to insure a sufficient amount of water in the combustion gases to condense on the interior of posatron 52. The condensed water and creosote flows downwardly into collection tank 50. The gases circulate within posatron 52 and then are conducted upwardly and out of the posatron through tubes 60 depending from manifolds 57, 58 and 59. As the gases leave posatron 52, intimate heat exchange contact is insured by maintaining the heat exchange tubes 72 submerged within the water vessel 34. The surface area of tubes 72 is sufficient to cause removal of all or nearly all of the available heat from the combustion gases as they flow through tubes 72 downwardly into the creosote collection tank 50. Simultaneously, further creosote and water vapor are condensed on the interior of tubes 72 and due to the conditions therein remain liquid and flow down tubes 72 into the collection chamber 50. The exhaust gases are either recycled through tube 20 into the fan 16 which in turn forces the air and exhaust gas mixture into the combustion chamber through air supply pipe 17, or the gases are exhausted to the atmosphere through conduit 48. Provision is made to wash out the interior of posatron 52 through pipe 68 as controlled by valve 70. Injection of water at the valve 70 causes a flow of water downwardly through the tubes 60 to clean out any solid deposits which may have formed of creosote or other substances.

The material collected in the creosote collection tank 50 consists of water condensed from the combustion gases and various other constituents, such as creosote, acidic aqueous solutions, ash and other normal combustion constituents. The material collected in tank 50 usually is a multiple phase material with creosote or similar substances floating on top of an underlying layer of water. The water layer normally will have a portion of the creosote materials or other materials disolved therein. Creosote, or other floating materials, are extracted through outlet 82 into collection basin 84 for disposal. The creosote material from the combustion of wood is a sticky mass which becomes relatively fluid when heated by operation of the system and can be readily removed by skimming from the tank 50 or flows outwardly therefrom under the force of gravity in the system as shown.

Figure 2:
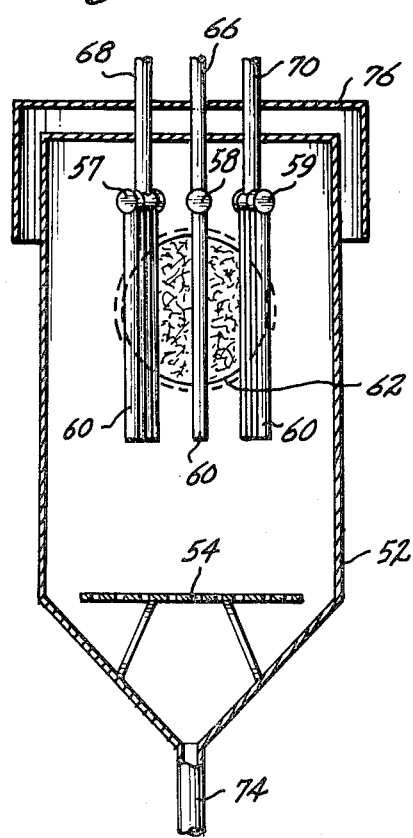
FIG. 2 is an enlarged side elevational view of the posatron of this invention partly in section taken along line 2—2 of FIG. 4.
Figure 3:
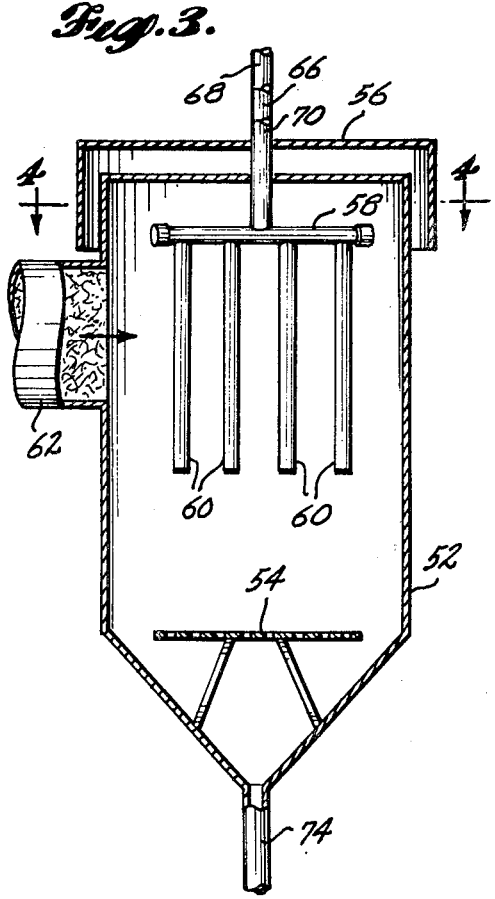
FIG. 3 is a side elevational view of the posatron of this invention partly in section taken along lines 3—3 of FIG. 4.
Figure 4:
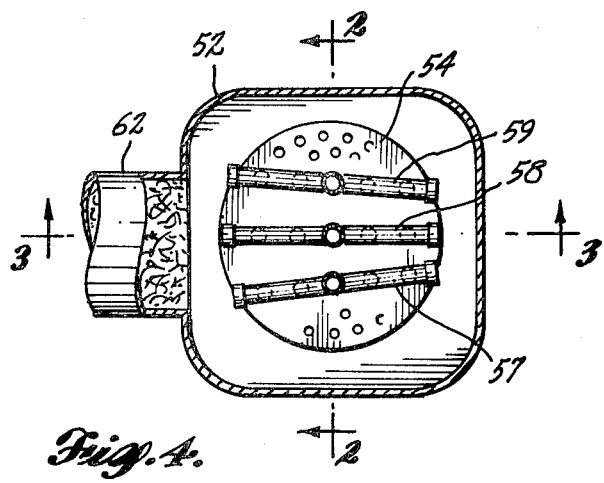
FIG. 4 is a plan view of the posatron partly in section taken along lines 4—4 of FIG. 3.

Referring specifically to FIGS. 2, 3 and 4, there is seen the interior of the posatron device in which the tertiary combustion and separation by condensation of combustion products occurs. In the embodiment shown three manifold structures 57, 58 and 59 are utilized to remove the spent combustion gases from the posatron. A plurality of tubing segments are shown depending from the manifolds 57, 58 and 59 and serve to collect gas from the central portion of the posatron. The gas flows upwardly into the aforementioned manifold segments and then is conducted through the top wall of posatron 52 into the heat exchange conduits 66, 68 and 70. Gases enter through the side wall of the posatron through inlet 62 and circulate about the interior of the posatron. Creosote is condensed along with water on the side and bottom walls of posatron 52 and flow downwardly past baffle 54 into the collector tube 74. A hood 56 is shown positioned above the posatron to control and regulate the convection induced flow of water around the upper surface of posatron 52. The presence of hood 56 serves to elevate the temperature in the upper region of the posatron to a skin temperature at or near the boiling temperature of water under normal operating conditions and thereby insure that the creosote will remain liquid.

Figure 5:
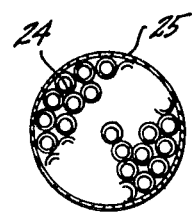
FIG. 5 is a cross sectional view of the tube bundle taken along lines 5—5 of FIG. 1.

The secondary zone, as discussed above, is shown in cross section in FIG. 5. A plurality of tubes 24 are bundled together and strapped in a close packed configuration by straps 25. The combustion gases are conducted through the interior of the bundle as well as through the intersticies present between the tubes in the bundle. As is best seen in FIG. 1, the pipe bundle 24 is maintained at an elevated temperature by its presence within the primary combustion area and serves to convert partially oxidized combustion gases further toward being fully burned.

There are two methods of utilizing the heat obtained through the apparatus shown. The first and primary method is to circulate water from tank 34 through hot water heating elements such as radiators or the like in remote locations. Hot water is removed from tank 34 through conduit 40 with valve 41 controlling the volume of flow. The water flows to a location at which heat is removed and the cool water returned to the bottom of tank 34 through conduit 42. Valve 43 is provided as a shutoff means if necessary. Provision is also made for the circulation of heated air to areas in which warm air is needed. Air enters the insulated box 15 of the stove apparatus through inlet 46 and may be flow induced by fan 47. The air circulates about the apparatus and is warmed both from the exterior surface of tank and from the exterior surface of firebox 10. The heated air is then conducted to the location desired through conduit 44.

In compliance with the statute, the invention has been described in language more or less specific as to structural features. It is to be understood, however, that this invention is not limited to the specific features shown since the means and construction herein disclosed comprise a preferred form of putting the invention into effect. The invention is, therefore, claimed in any of its forms or modifications within the legitimate and valid scope of the appended claims appropriate interpreted in accordance with the doctrine of equalivents.

What is claimed is:

1. A stove for the combustion of wood, coal or other fuels comprising:
   a primary combustion zone having a fuel inlet, an air inlet and a combustion gas outlet;
   a secondary combustion zone comprising an elongated bundle of tubes extending at least a portion of their length into said primary combustion zone and adapted to conduct combustion gases from said primary combustion zone and continue the combustion thereof;
   a tertiary combustion and condensation zone communicating with said secondary combustion zone, said tertiary combustion and condensation zone being surrounded by a heat exchange medium to remove heat therefrom and condense water and other condensables while cooling said combustion gases;
   means to conduct combustion gases from said tertiary combustion and condensation zone through conduits in heat exchange contact with said heat exchange medium and then to the atmosphere after removal of heat therefrom; and,
   means to conduct said water and other condensable from said tertiary combustion and condensation chamber into a collection vessel.

2. The apparatus of claim 1 wherein said means to conduct combustion gases from said tertiary combustion and condensation zone discharges into said collection vessel to collect additional water and condensables therein.

3. The apparatus of claim 1 wherein said heat exchange medium is water contained in a tank surrounding said tertiary combustion and condensation zone.

4. The apparatus of claim 1 wherein said tertiary combustion and condensation zone is contained within a vessel immersed in water.

5. The apparatus of claim 4 wherein said vessel comprises a closed container with a side wall, a top wall and a bottom wall, said side wall having an aperture therein for entry of combustion gases from said secondary combustion zone, said bottom converging toward a condensables outlet and said top wall having a plurality of conduits extending therethrough into the interior of said vessel for removal of combustion gases in heat exchange contact with said heat exchange medium.

6. The apparatus of claim 1 further including a combustion catalyst positioned between said secondary combustion zone and said tertiary combustion and condensation zone.

7. The apparatus of claim 6 wherein said catalyst comprises stainless steel wool.

8. The apparatus of claim 2 and means to recycle a portion of the combustion gases from said collection vessel into said primary combustion zone.

9. The apparatus of claim 1 and means to conduct said heat exchange medium to a remote location to supply heat.

10. The apparatus of claim 1 and air flow control means to conduct air in heat exchange relationship about the exterior of said primary combustion zone to heat the air for use in a hot air recycle system.

11. The apparatus of claim 1 and means to inject water into said primary combustion zone.

12. A method of recovering heat and removing condensable materials from combustion gases comprising the steps of:
    burning wood or coal in a primary combustion zone;
    transmitting combustion gases through a bundle of tubes projecting partially into said primary combustion zone whereby secondary combustion of said gases occurs;
    injecting said gases into a tertiary combustion and condensation zone wherein said gases are further combusted and are cooled to induce condensation of water, creosote or other condensables on the interior surface of a vessel enclosing said tertiary combustion and condensation zone;
    discharging said combustion gases to the atmosphere through heat exchange tubes wherein said gases are cooled and further condensables removed; and,
    collecting condensables in liquid form from said vessel and said heat exchange tubes.

13. The method of claim 12 and subjecting said combustion gases to a catalyst between said secondary and said tertiary zones to promote further oxidation thereof.

14. The method of claim 12 and injecting water into said primary combustion zone to promote condensation of condensable materials in said tertiary combustion and condensation zone in liquid form.

* * * * *